(12) United States Patent
Mcmurray

(10) Patent No.: US 9,932,764 B2
(45) Date of Patent: Apr. 3, 2018

(54) FLEXIBLE VAULT

(71) Applicant: William Mcmurray, Detroit, MI (US)

(72) Inventor: William Mcmurray, Detroit, MI (US)

( * ) Notice: Subject to any disclaimer, the term of this patent is extended or adjusted under 35 U.S.C. 154(b) by 0 days.

(21) Appl. No.: 15/153,254

(22) Filed: May 12, 2016

(65) Prior Publication Data

US 2016/0258203 A1 Sep. 8, 2016

Related U.S. Application Data

(63) Continuation of application No. 14/463,976, filed on Aug. 20, 2014, now abandoned.

(51) Int. Cl.
| | | |
|---|---|---|
| *A45C 13/18* | (2006.01) | |
| *E05G 1/00* | (2006.01) | |
| *E05G 1/02* | (2006.01) | |
| *A45C 13/36* | (2006.01) | |
| *E05B 65/00* | (2006.01) | |
| *E05G 1/024* | (2006.01) | |
| *E05G 1/04* | (2006.01) | |
| *E05G 1/06* | (2006.01) | |
| *E05G 1/10* | (2006.01) | |
| *G01S 19/16* | (2010.01) | |
| *G01S 19/42* | (2010.01) | |
| *A45C 3/00* | (2006.01) | |

(52) U.S. Cl.
CPC .............. *E05G 1/005* (2013.01); *A45C 13/18* (2013.01); *A45C 13/36* (2013.01); *E05B 65/0075* (2013.01); *E05G 1/02* (2013.01); *E05G 1/024* (2013.01); *E05G 1/04* (2013.01); *E05G 1/06* (2013.01); *E05G 1/10* (2013.01); *G01S 19/16* (2013.01); *G01S 19/42* (2013.01); *A45C 3/001* (2013.01)

(58) Field of Classification Search
CPC ........... A45C 1/12; A45C 13/18; A45C 13/36; A45C 2001/003
USPC .................. 150/102, 134, 129, 130; 383/109
See application file for complete search history.

(56) References Cited

U.S. PATENT DOCUMENTS

| | | | | | |
|---|---|---|---|---|---|
| 1,718,276 | A | * | 6/1929 | Child ...................... | A45C 3/06 206/260 |
| 2,230,998 | A | * | 2/1941 | Coakley ................ | B65D 31/04 383/113 |
| 3,200,868 | A | * | 8/1965 | Strayer ................. | A45C 13/18 383/86 |

(Continued)

FOREIGN PATENT DOCUMENTS

GB          2359012 A    *   8/2001    ............. A45C 13/18

*Primary Examiner* — Sue A Weaver
(74) *Attorney, Agent, or Firm* — Dinsmore & Shohl LLP

(57) ABSTRACT

The invention is a bag, suitcase, wallet, money belt, purse or briefcase; a flexible vault of the present invention includes an outer pouch having a multilayer construction. The multilayer construction includes at least an inner layer, an outer layer, a first middle layer, and a second middle layer. In addition to the outer pouch, the flexible vault can also include an inner pouch having an extendable roll up portion which extends through an opening in the outer pouch when the outer pouch and the inner pouch are in an open position. The front panel, back panel, and fold over panel of the outer pouch each include an aperture. When the outer pouch is in a closed position the apertures align, enabling a locking mechanism to be threaded through all the apertures which secures the pouch in the closed position.

3 Claims, 8 Drawing Sheets

(56) References Cited

U.S. PATENT DOCUMENTS

| | | | | | |
|---|---|---|---|---|---|
| 4,175,604 | A | * | 11/1979 | Bonner | B65D 33/34 383/120 |
| 5,061,086 | A | * | 10/1991 | Vallerga | A45C 1/00 150/102 |
| 5,913,607 | A | * | 6/1999 | Lengyel, Sr. | A45C 13/00 383/110 |
| 6,702,169 | B2 | * | 3/2004 | Eipper | B60R 7/02 224/543 |
| 7,155,881 | B1 | * | 1/2007 | McGuire | A45C 3/10 190/101 |
| 7,913,839 | B2 | * | 3/2011 | Fawcett | B65D 29/04 206/315.1 |
| 8,079,172 | B2 | * | 12/2011 | Dudney | A01K 97/08 43/26 |
| 2003/0110818 | A1 | * | 6/2003 | Schlipper | A45C 13/1046 70/18 |
| 2013/0249681 | A1 | * | 9/2013 | Olivier | A45C 1/00 340/426.1 |
| 2016/0053525 | A1 | * | 2/2016 | McMurray | E05G 1/005 150/130 |

* cited by examiner

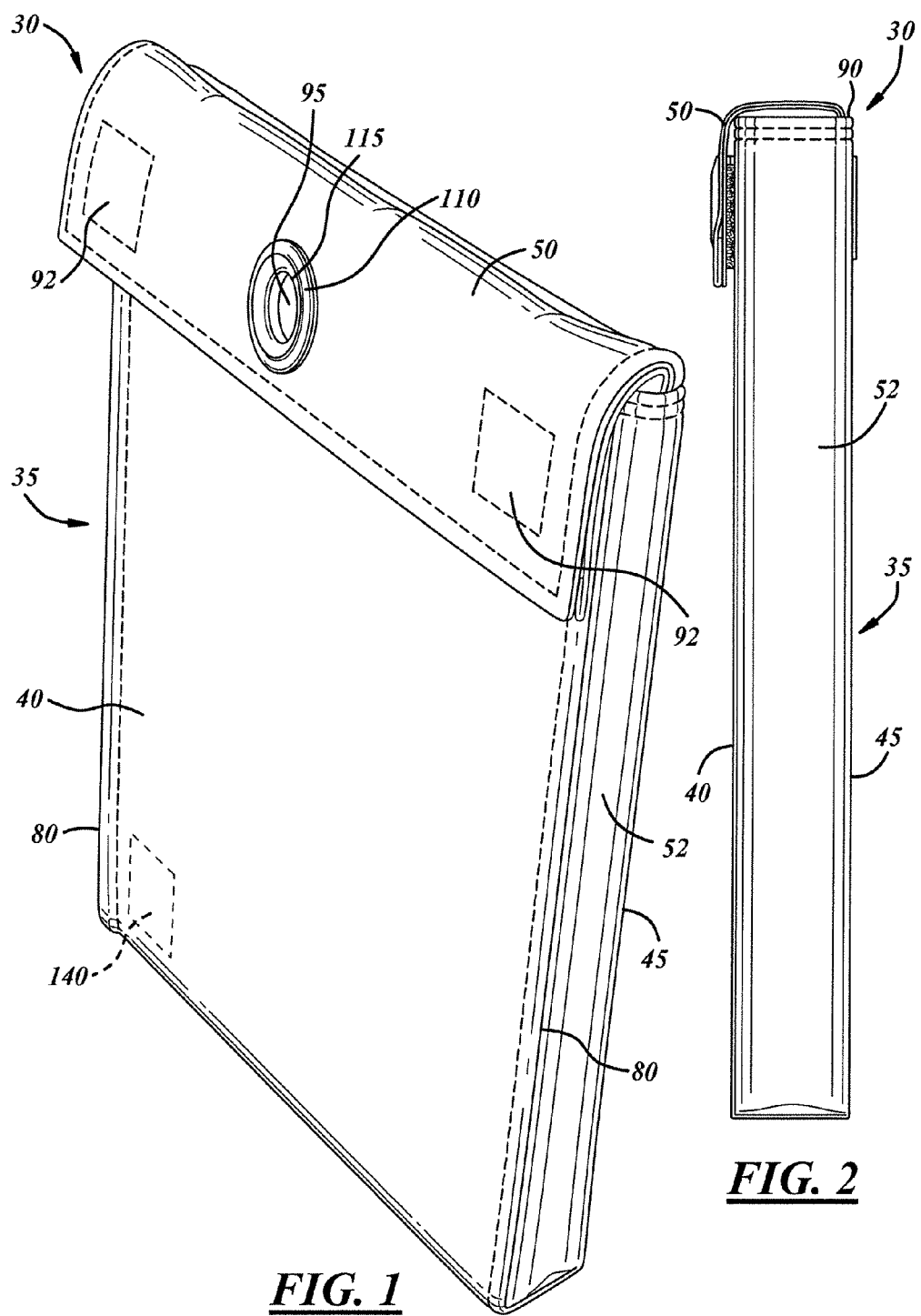

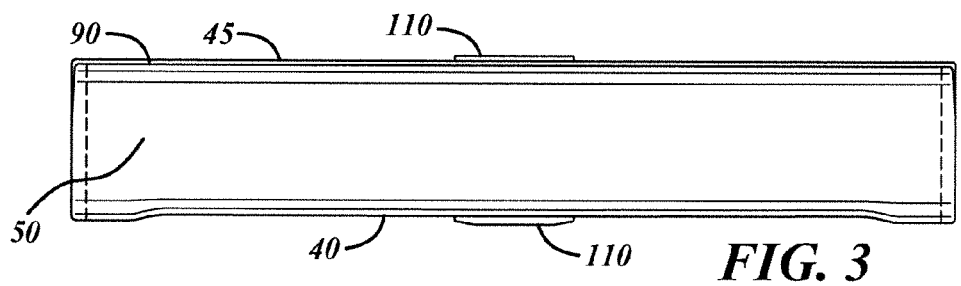
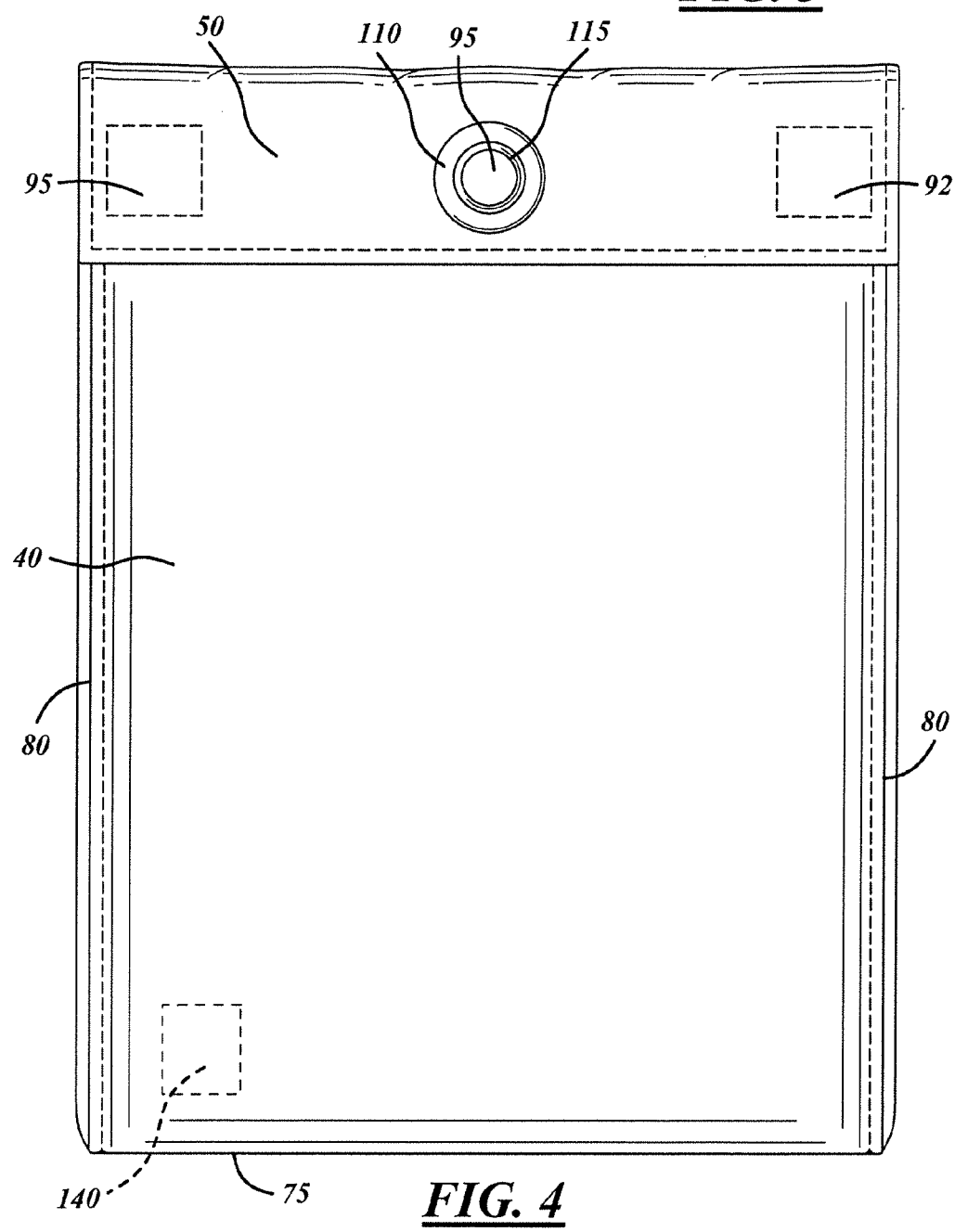

FLEXIBLE VAULT

CROSS REFERENCE TO RELATED APPLICATIONS

This Application is a Continuation of application Ser. No. 14/463,976 filed Aug. 20, 2014, which is incorporated herein by reference.

FIELD OF THE INVENTION

The present invention relates to a vault for the safekeeping of valuables. More specifically, it relates to a portable, lightweight, flexible vault being easy to manufacture, transport and to secure.

BACKGROUND OF THE INVENTION

Vaults for safekeeping of property have been known in the art for quite some time. These vaults can often have properties which include a resistance to outside forces and elements, for example, an impact resistance, a fire resistance, a water resistance, etc. These vaults have also been known to be lockable to provide safekeeping of valuables within the vault.

Vaults that are currently known can also be mounted to a more secure structure such as a floor or wall of a building, for example by the use of lag bolts through attachment holes in the feet of a vault.

To achieve these desired properties vaults currently known feature construction of heavy and robust materials such as sheet metals, concrete, and the like. Construction in this nature has presented a common problem to vaults in that while being able to provide security for valuables, these vaults are relatively immobile thereby only providing security in a single location. In addition the current construction methods and materials can be relatively high in cost.

As such, it is an object of the present invention to solve the above problems and provide a vault for the safekeeping of valuables which is both relatively low cost in manufacture and portable while at the same time providing safety for storage of valuables.

SUMMARY OF THE INVENTION

A flexible vault of the present invention includes an outer pouch. The outer pouch has a front panel, a back panel, and a fold over panel. The front panel and back panel are secured to each other along a bottom edge and a side edge of the outer pouch thereby creating an opening in the outer pouch along a top edge. The fold over panel is secured to the back panel along the top edge and the fold over panel is operable to cover the opening and create a closed position.

The front panel and the back panel each have a multilayer construction. The multilayer construction includes at least an inner layer, an outer layer, a first middle layer, and a second middle layer. This multilayer construction can further include a third middle layer and a fourth middle layer.

The layers of the multilayer construction can be made from various materials to provide the desired security characteristics to the flexible vault. For example, a rubberized layer can be used to provide water resistance, a layer of para-aramid synthetic fiber material can be used to provide impact resistance, a woven steel layer can be used to provide further impact resistance as well as cut resistance and fire resistance, an RFID blocking layer such as metal or aluminum foil can be used to provide scanning resistance and security to electronics and magnetically coded items, such as credit cards, contained within the vault, and a metal mesh layer, such as chainmail, can also be utilized to provide even further security to the pouch.

The front panel, back panel, and fold over panel each include an aperture. When the outer pouch is in a closed position the apertures in the fold over panel, front panel, and back panel align, enabling a locking mechanism to be threaded through all the apertures which secures the pouch in the closed position. The locking mechanism is a unit which is secured to a fixed object such as the floor or the wall. The locking mechanism includes a shaft which is threaded through the apertures and a head which is placed on top of the shaft and locked with a key to prevent the flexible vault from being removed from the shaft, the head being sized such that it cannot pass through the apertures. The apparatus detailed in U.S. Pat. No. 6,932,211 could be modified to for use to secure the flexible vault, and is incorporated herein by reference.

To help strengthen the apertures, metal grommets may be used within the apertures. These metal grommets have an inner diameter large enough to receive the lock. The grommets could also be made from plastic, fabric, or any other material suitable for reinforcing apertures known to those skilled in the art.

To provide a higher level of security for storing item within the flexible vault, the lock used with the present invention is capable of withstanding 4,700 pounds of force, for example by being made of steel and having a shaft diameter of about ¾ of an inch. The metal grommets also having an inner diameter of at least ¾ of an inch to receive the lock.

The flexible vault of the present invention in certain embodiments also include a GPS unit, the GPS unit being operable to provide tracking and location data information so that the owner of the flexible vault can track the flexible vault if it is ever lost or stolen.

The GPS unit in the present embodiment is disposed within the outer pouch. If the outer pouch includes a RFID blocking layer in the multilayer construction, then the GPS tracking unit is disposed underneath at least the outer layer but on top of the RFID layer.

In addition to the outer pouch, the flexible vault of the present invention can also include an inner pouch, the inner pouch being disposed within the outer pouch, the inner pouch having an extendable roll up portion which extends through the opening in the outer pouch when the outer pouch and the inner pouch are in an open position. This inner pouch can be fixedly attached to the outer pouch and can further include a Velcro® strip with hooks and a Velcro® strip with loops attached to the extendable roll up portion so that the roll up portion can be rolled up to create a closed position, the Velcro® strip with hooks securing to the Velcro® strip with loops to secure the inner pouch in a closed position. In addition the inner pouch can include a longitudinally oriented Velcro® strap secured to the extendable roll up portion at a midpoint of the Velcro® strap, the Velcro® strap having a first free end and a second free end, the first free end having Velcro® hooks and the second free end having Velcro® loops, the first free end being attachable to the second free end to help secure the inner pouch in an alternate closed position.

When an inner pouch and an outer pouch are utilized along with a GPS tracking unit, the GPS tracking unit can be disposed between the inner pouch and outer pouch.

BRIEF DESCRIPTION OF THE DRAWINGS

FIG. 1 shows a perspective view of an embodiment of the flexible vault;

FIG. 2 shows an elevational side view of an embodiment of the flexible vault;

FIG. 3 shows a plan top view of an embodiment of the flexible vault;

FIG. 4 shows an elevational front view of an embodiment of the flexible vault;

DETAILED DESCRIPTION OF THE INVENTION

Figure 5:
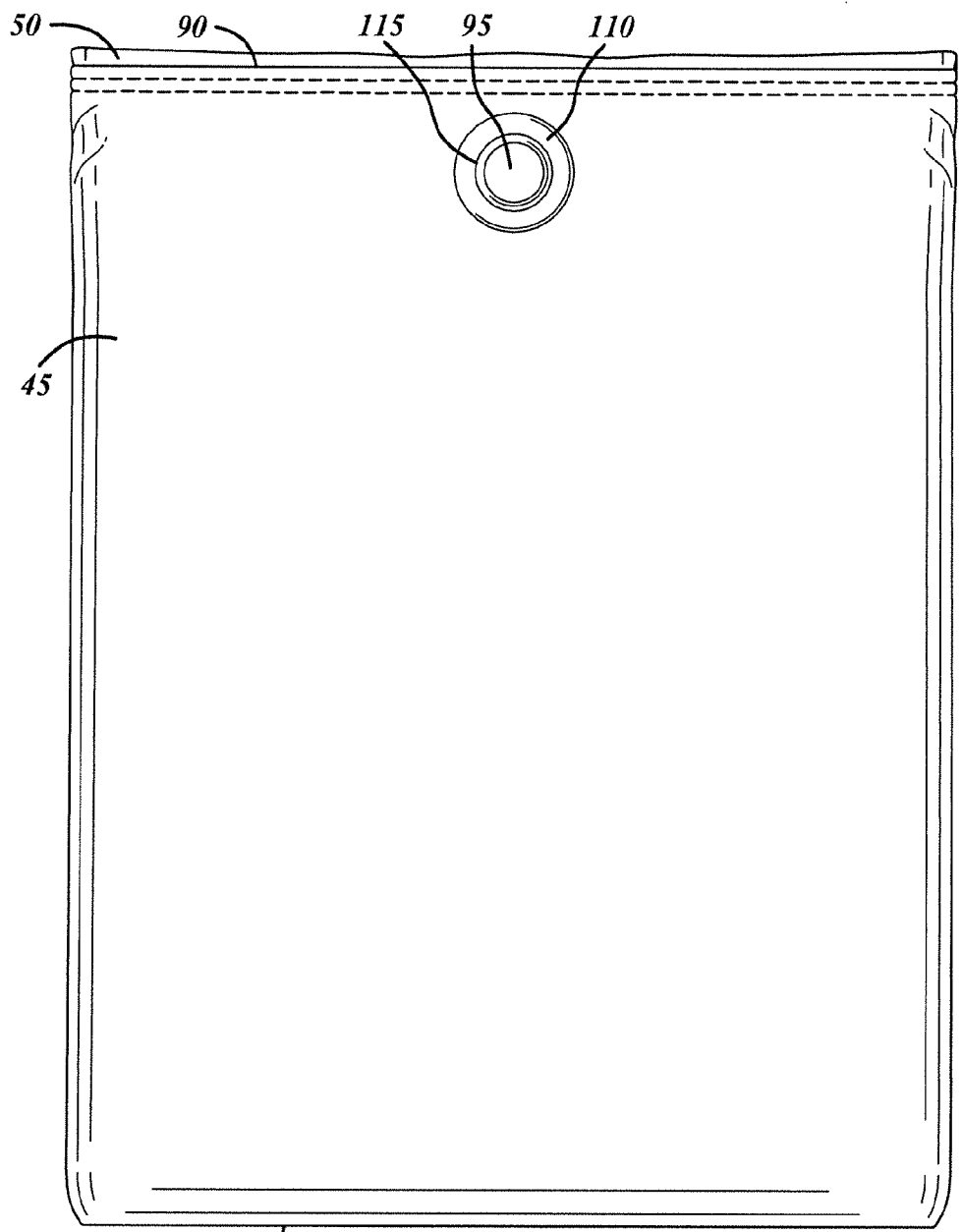
FIG. 5 shows an elevational back view of an embodiment of the flexible vault.
Figure 6:
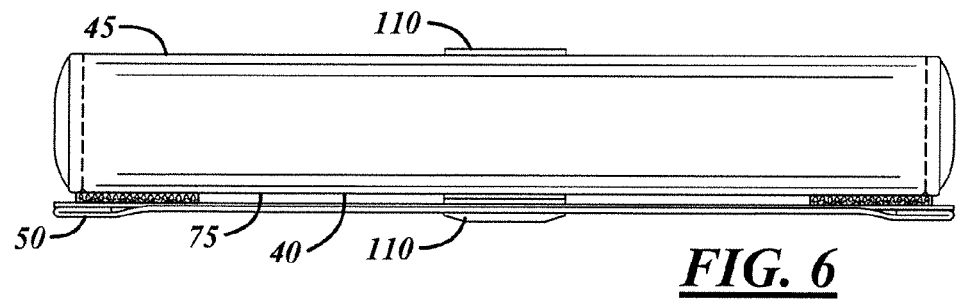
FIG. 6 shows a plan bottom view of an embodiment of the flexible vault.
Figure 7:
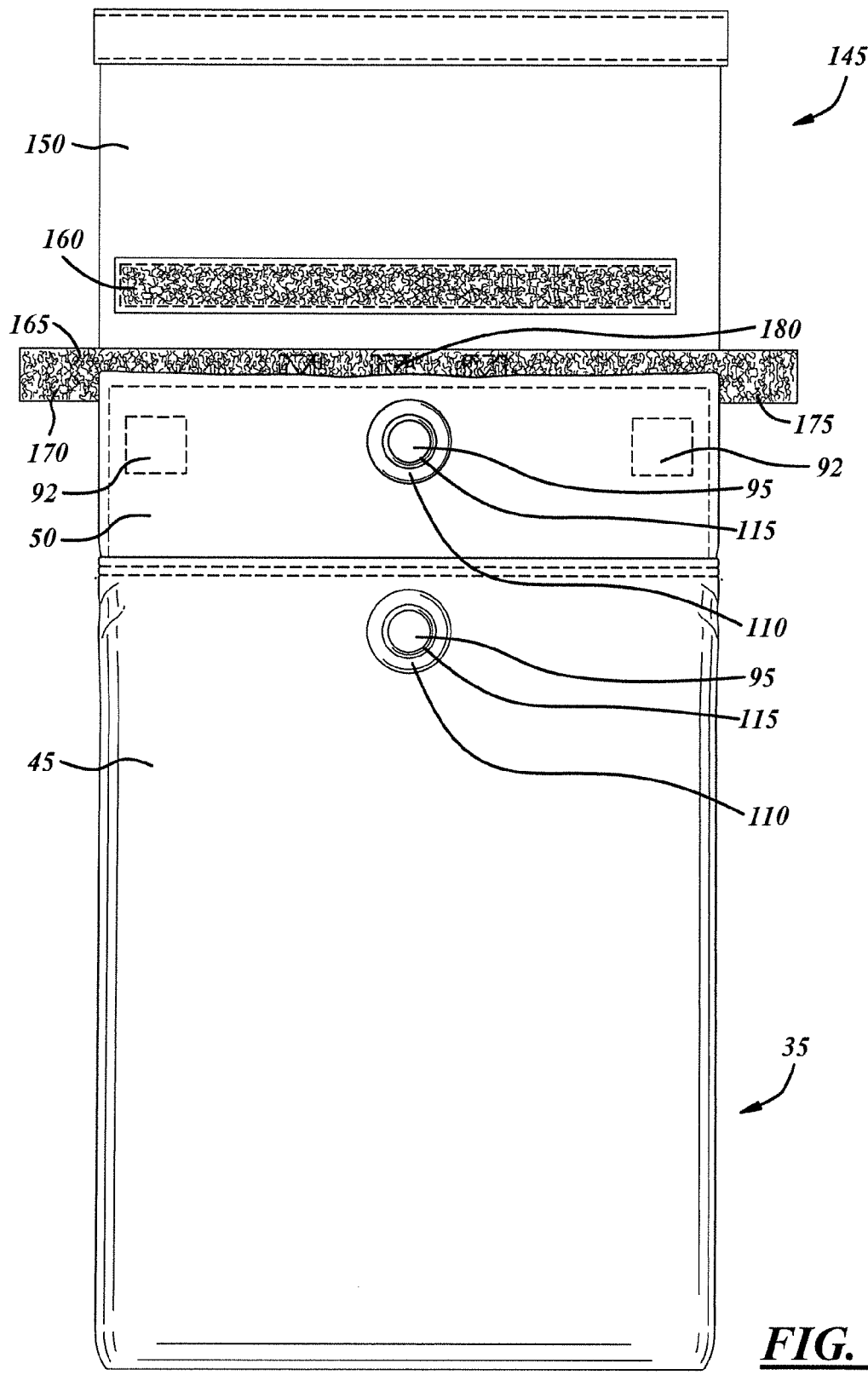
FIG. 7 shows a elevational front view of an embodiment of the flexible vault in an open position.
Figure 8:
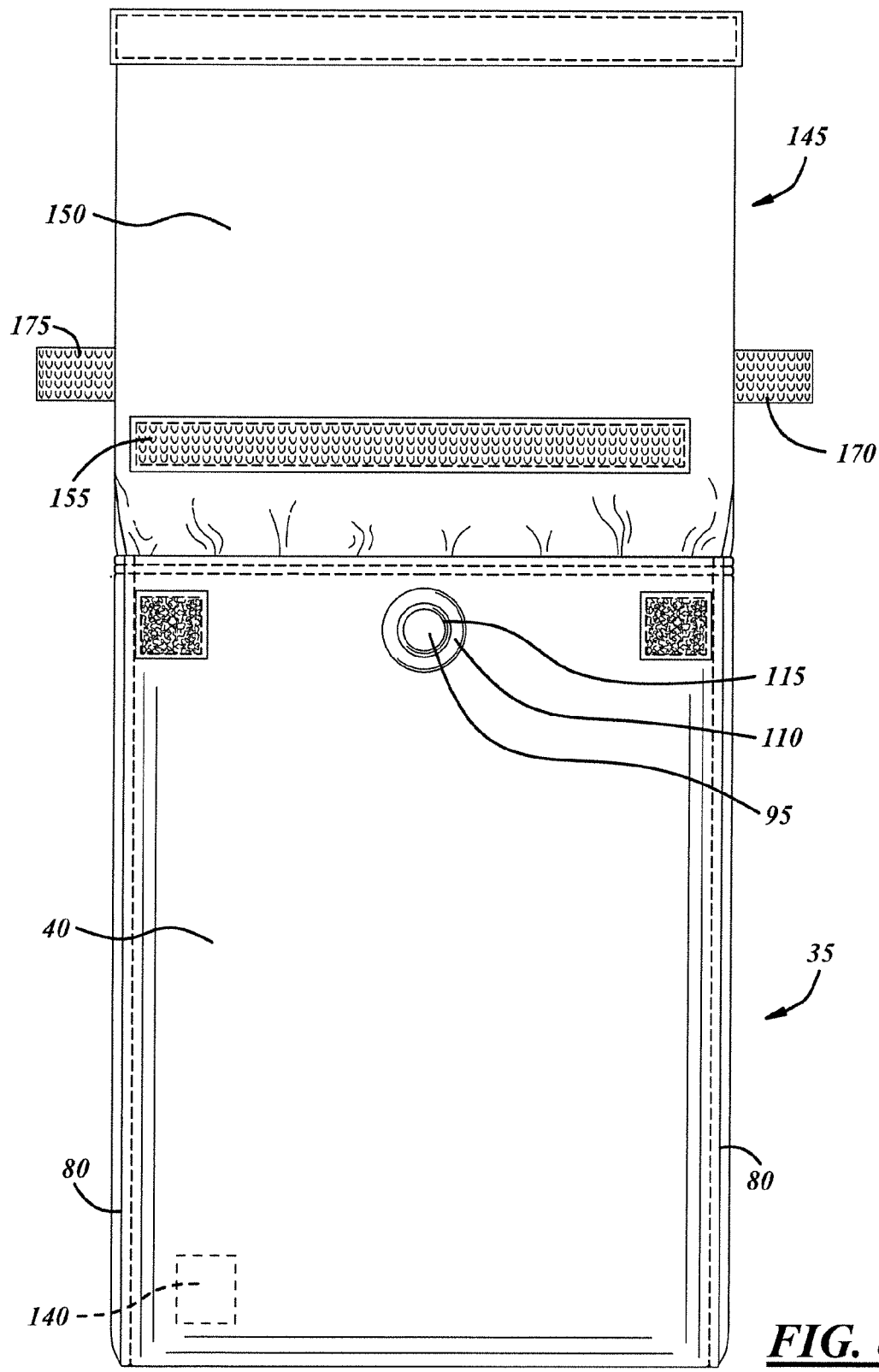
FIG. 8 shows an elevational back view of an embodiment of the flexible vault in an open position.

In the preferred embodiment of the present invention a flexible vault 30 includes an outer pouch 35, the outer pouch 35 being formed from a front panel 40, a back panel 45, and a fold over panel 50.

The front panel 40 and back panel 45 are constructed using a multilayer construction. In the preferred embodiment this multilayer construction includes an inner layer 55, an outer layer 60, a first middle layer 65, and a second middle layer 70. To produce the multilayer construction the inner layer 55, outer layer 60, first middle layer 65, and second middle layer 70 are stacked upon each other and then secured to one another using stitching or adhesive means or any other method known to those skilled in the art.

In the preferred embodiment the outer layer 60 is a rubberized layer, for example being made of a flexible, moldable, polymer based material known to those skilled in the art. The first middle layer 65 in the preferred embodiment is an interwoven Kevlar layer. The manufacturing process for an interwoven Kevlar layer is known to those skilled in the art. The third middle layer of the preferred embodiment is a woven steel layer preferably made of small diameter stainless steel.

In addition to the preferred embodiment discussed above, numerous other embodiments exist to help achieve the desired characteristics and problem solutions described above. One such alternative embodiment includes a third middle layer 100 in the multilayer construction. In this alternate embodiment the outer layer is a metal mesh type of layer such as chainmail, for example that type used in shark safety suits. The first middle layer 65 is a rubberized layer, the second middle layer 70 is a Kevlar and/or Dyneema layer, and the third middle layer 100 is a woven steel layer. All of these layers are similar to those manufactured and having materials similar to those discussed above. This alternative embodiment featuring an outer layer 60 made of a metal mesh material provides additional impact and puncture resistance as compared to the preferred embodiment.

In yet another alternative embodiment the multilayer construction includes a fourth middle layer 105. This fourth middle layer is made of an RFID blocking material such that the fourth middle layer protects certain electronics, credit cards, and the like from being scanned or detected by apparatus outside of the flexible vault 30. One type of material that can be used for the RFID blocking layer is a metal foil layer, for example a layer of aluminum foil.

Once the multilayer construction is completed, the outer pouch 35 having the front panel 40 and the back panel 45 is formed. To form the preferred embodiment, the front panel 40, the back panel 45, as well as the side panels 52 are formed from a single piece of the multilayer constructed material. In this preferred embodiment, the front panel 40 is folded up over the back panel 45. The side panels 52 extend from the back panel 45, and are folded up to mate with the front panel 40. The side panels 52 are then stitched to the front panel 40 along the side edges 80 of the outer pouch 35. Other methods could also be used, such as, having individual sheets of the multilayer constructed material for both the front panel and the back panel. The front panel could then by overlaid on the back panel. After this overlaying, the front panel could be stitched to the back panel along the side edges and a bottom edge to form the outer pouch. Other methods known to those skilled in the art could be utilized, so long as the front panel and back panel are secured to each other to form the outer pouch. The securing of the front panel 40 to the back panel 45 is achieved by securing in any method known to those skilled in the art, for example by stitching along a bottom edge 75 of the outer pouch as well as securing along side edges 80 of the outer pouch. After the securement of the front panel 40 to the back panel 45 along the bottom edge 75 and side edges 80, an opening in the outer pouch 85 is thereby created along a top edge 90 of the outer pouch 35.

The fold over panel 50 having a multilayer construction as described above is attached along the top edge 90 of the outer pouch. This attachment along the top edge secures the fold over panel 50 to the back panel 45. After securement the fold over panel 50 is operable to cover the opening 85 along the top edge 90 thereby creating a closed position of the outer pouch 35. In the preferred embodiment, the front panel 40 and fold over panel 50 are secured to each other when in the closed position by at least one Velcro® tab 92. It is appreciated that instead of being a separate piece which is attached to the back panel 45, the fold over panel 50 could be part of the same piece of multilayer constructed material used for the back panel 45. For example by having an additional extended portion be the fold over panel 50, this additional extended portion originally manufactured with the back panel 45.

The front panel 40, back panel 45, and the fold over panel 50 also each include an aperture 95. The apertures 95 in the front panel 40, back panel 45, and fold over panel 50 align when the outer pouch 35 is in the closed position.

In addition to the features previously described, the preferred embodiments and alternate embodiments can further include a metal grommet 110 disposed in each aperture 95. This metal grommet helps to strengthen and reinforce the multilayer material of the various panels around the apertures 95. In addition the metal grommet 110 has an inner diameter 115. This inner diameter is large enough to accept a lock 120 to maintain the flexible vault 30 in the closed position.

The lock 120 of the preferred embodiment includes a lock shaft 125, a lock head 130, and a lock key 135. In operation the grommets 110 slide over the lock shaft 125. To enable this, the inner diameter 115 of the metal grommet is larger than a diameter of the lock shaft 125. To secure the flexible vault 30 to the lock 120, the lock head 130 is sized such that it cannot pass through the apertures 95 or the inner diameter of the metal grommet 115. To operate the lock of the preferred embodiment the lock key 135 can be used to unlock the lock head 130 wherein the lock head 130 can then be removed from the lock shaft 125 allowing the flexible vault 30 to be positioned onto the lock 120 by threading the lock shaft 125 through the apertures 95 or the metal grommet 110 of the preferred embodiment.

The lock 120 is utilized to fixedly attach the flexible vault to a relatively immovable object. For example, the lock 120 can be bolted to a secure part of a structure, such as the framing in a building. In another example, the lock 120 is bolted to an vehicle, such as to the inside of a car trunk. Numerous similar uses exist, wherein the lock 120 is secured with bolts, or welding, or any other suitable method known to those skilled in the art, to another heavy or fixed article, thereby rendering the lock 120, and the flexible vault secure to it, immobile.

In the preferred embodiment the lock 120 has a lock shaft capable of withstanding at least a pull force of 4,700 pounds. The preferred embodiment lock shaft 125 has a diameter of ¾ of an inch and is made of steel to achieve this result.

In addition, the preferred embodiment and alternate embodiments can include a GPS tracking unit 140, for example an electronic unit known to those skilled in the art which is used to track the location of an object to which the GPS tracking unit 140 is attached from a remote location. The GPS tracking unit 140 is disposed within the outer pouch 35. If the panels of the outer pouch 35 include an RFID layer, the GPS tracking unit 140 is disposed between the outer layer 60 and the RFID blocking layer.

The flexible vault 30 of the preferred embodiment further includes an inner pouch 145. The inner pouch is manufactured of water resistant material such as nylon or vinyl as is known to those skilled in the art. The inner pouch 145 is disposed within the outer pouch 35. The inner pouch 145 includes an extendable roll up portion 150. The extendable roll up portion extends through the opening 85 in the outer pouch 35 when the outer pouch 35 and the inner pouch 145 are both in an open position.

Figures 9, 10:
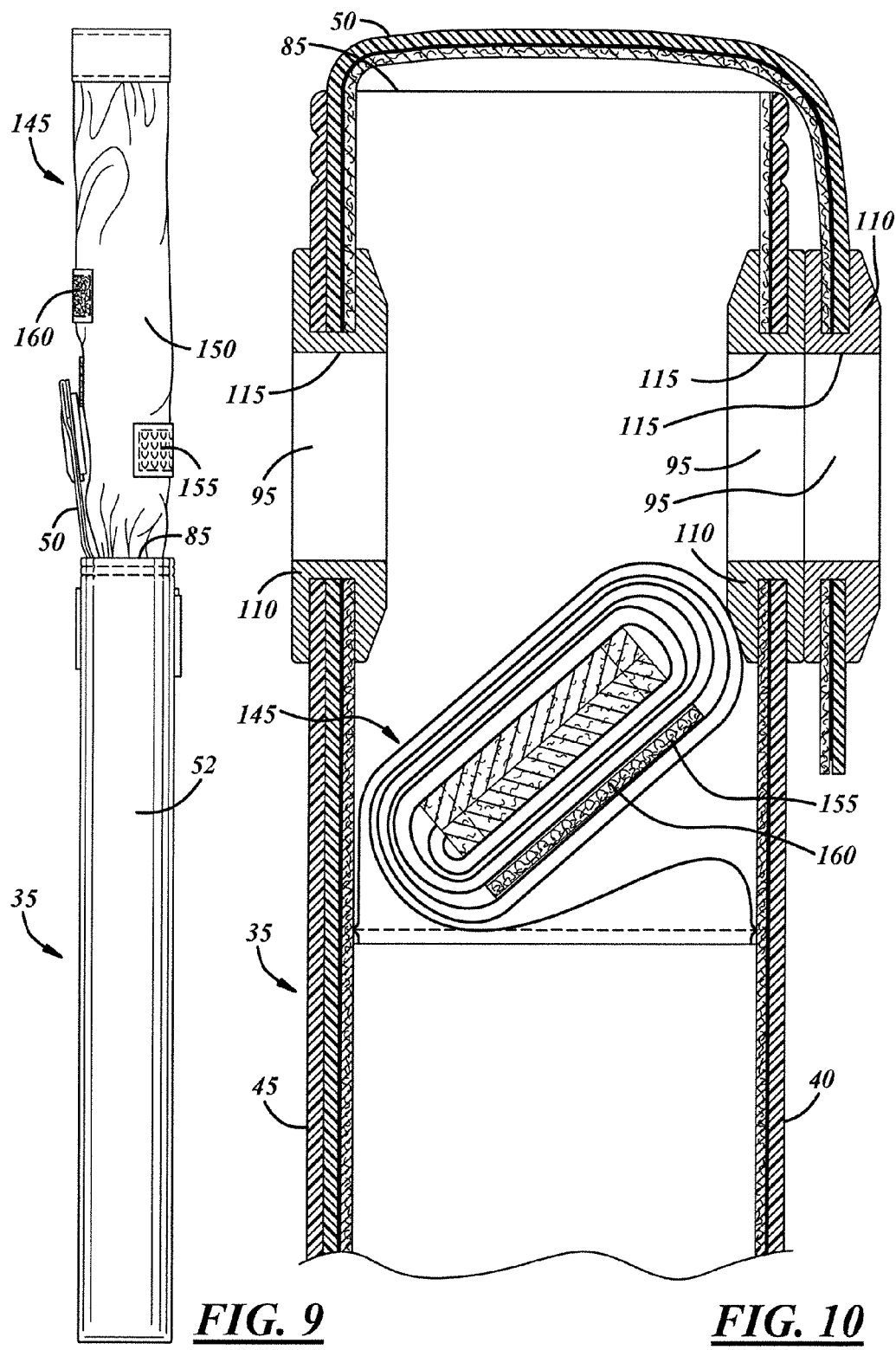
FIG. 9 shows an elevational side view of an embodiment of the flexible pouch in an open position.
FIG. 10 shows a section view of a top portion of an embodiment of the flexible pouch.
Figure 11:
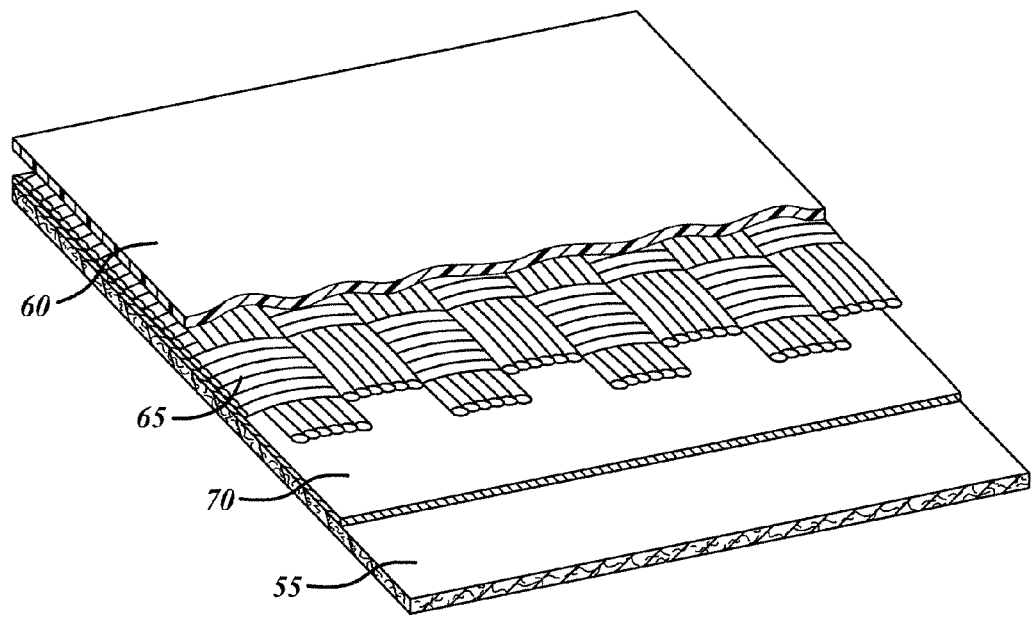
FIG. 11 shows a perspective view of an embodiment of the multilayer construction.
Figure 12:
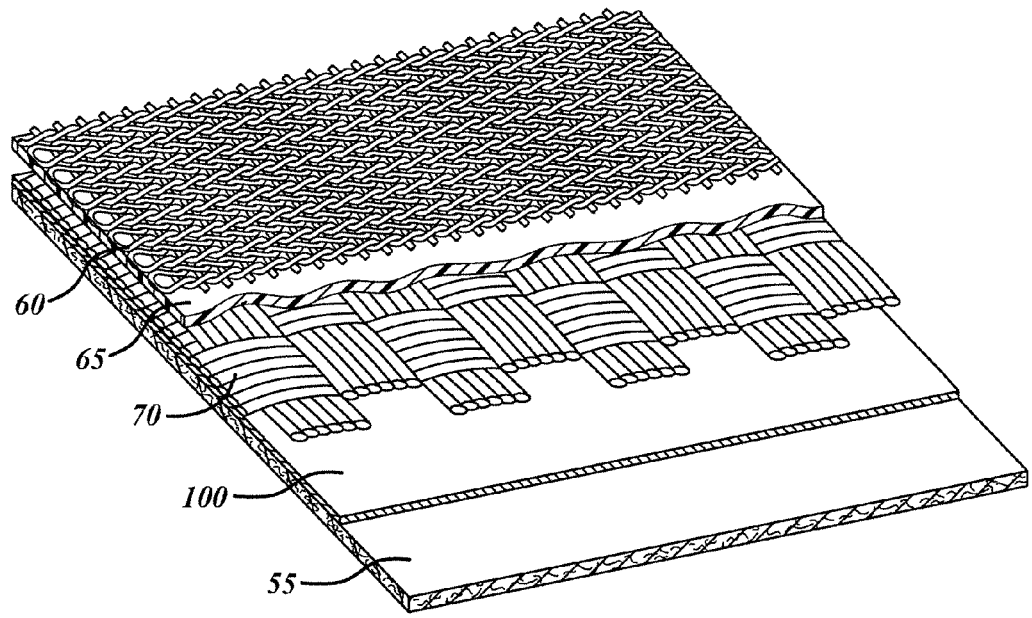
FIG. 12 shows a perspective view of another embodiment of the multilayer construction.
Figure 13:
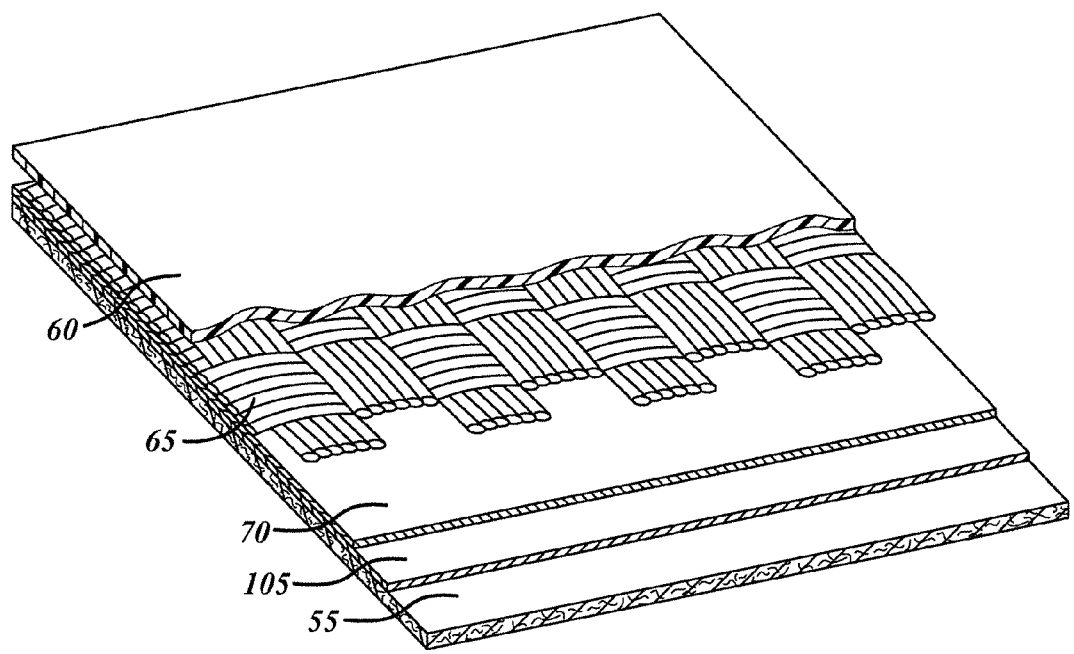
FIG. 13 shows a perspective view of still another embodiment of the multilayer construction.
Figure 14:
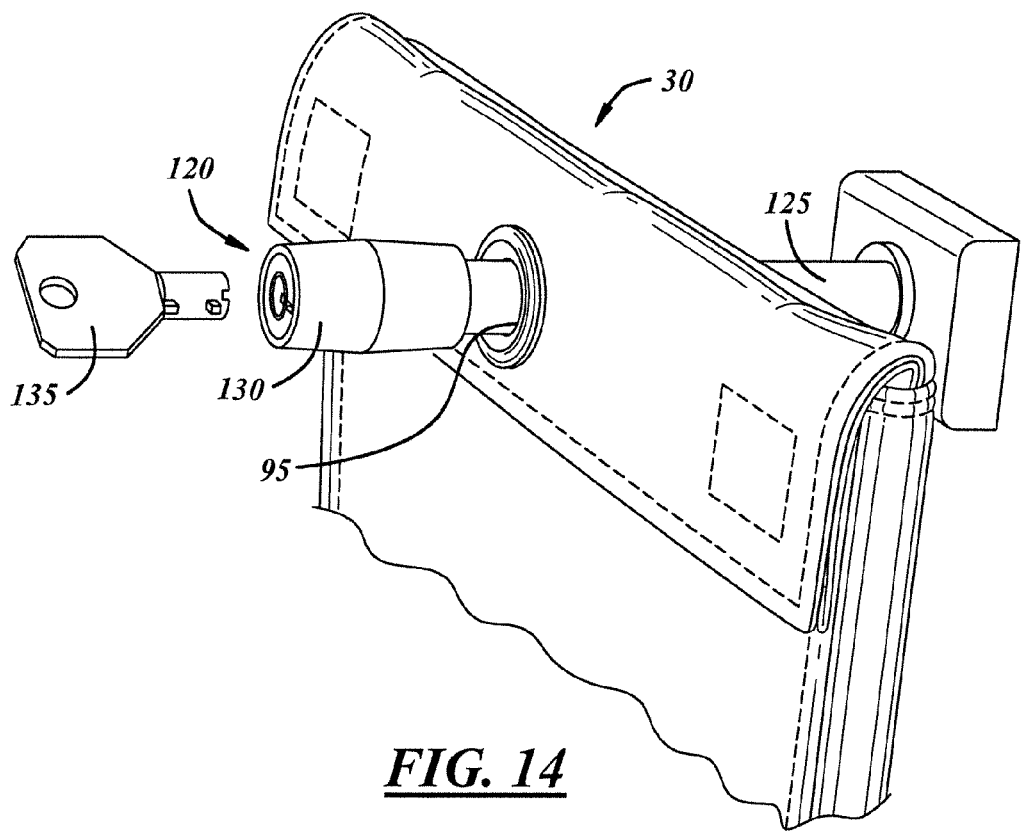
FIG. 14 shows a perspective view of an embodiment of the flexible vault on an embodiment of a lock.

To create a closed position of the inner pouch 45, the extendable roll up portion 150 is rolled up and then disposed within the opening 85 of the outer pouch 35 as is shown in FIG. 10. The extendable roll up portion 150 of the preferred embodiment further includes a Velcro® strip with hooks 155 and a Velcro® strip with loops 160. The Velcro® strip with hooks 155 and Velcro® strip with loops 160 are attached to the extendable roll up portion 150 in a manner such that when the extendable roll up portion 150 is rolled up to create the closed position of the inner pouch 145, the extendable strip with hooks 155 secures to the Velcro® strip with loops 160 to maintain the inner pouch 145 in a closed position.

In the preferred embodiment the inner pouch 145 is fixedly attached to the outer pouch thereby preventing the inner pouch from being removed from the outer pouch. In this preferred embodiment when a GPS tracking unit 140 is included, the GPS tracking unit 140 is disposed between the inner pouch 145 and the outer pouch 35.

In an alternate embodiment the extendable roll up portion 150 includes a Velcro® strap 165. The Velcro® strap has a first free end 170 and a second free end 175. The Velcro® strap 165 is attached to the extendable roll up portion 150 at a midpoint 180 of the Velcro® strap 165. The first free end 170 and second free end 175 have Velcro® hooks and loops respectively thereby enabling the extendable roll up portion to be folded down over itself and the Velcro® strap 165 to be wrapped around the extendable roll up portion 150 to create an alternate closed position of the extendable roll up portion 150.

It is understood and appreciated that the multilayer construction described herein may be used to create flexible vaults of various sizes and shapes beyond the above described pouch. For example, the pouch of the present invention includes bags, suitcases, wallets, money belts, purses or briefcases made from the multilayer construction. These items having the multilayer construction will prevent scanning and x-ray from reading or detecting the contents of contained therein, such as hard drives, memory chips, magnetic strips, passports, driver's license codes, etc. Further security is provided by the items being waterproof and including a GPS chip.

The present invention has been described in an illustrative manner. It is understood that the terminology which has been used is intended to be in the nature of words of description rather than limitation. As such, many modifications and variations of the present invention are possible in light of the above teachings.

The invention claimed is:

1. A flexible vault comprising:
an outer pouch;
the outer pouch including a front panel, a back panel, and a fold over panel, the front panel and back panel being secured to each other along a bottom edge and side edges of the outer pouch thereby creating an opening in the outer pouch along a top edge, the fold over panel being secured to the back panel along the top edge, the fold over panel operable to cover the opening and create a closed position;
the front panel and the back panel each having a multilayer construction, the multilayer construction including at least an inner layer, an outer layer, a first middle layer and a second middle layer, wherein the outer layer is a rubberized layer, the first middle layer is a layer of synthetic fiber, and the second middle layer is a woven steel layer;
the front panel, back panel and fold over panel each including an aperture, wherein the apertures align when the pouch is in the closed position thereby enabling a lock to be threaded through the apertures to secure the pouch in the closed position; and
a third middle layer being an RFID blocking layer.

2. The flexible vault as defined in claim 1 and in which said third layer is a layer of metal foil.

3. The flexible vault as defined in claim 1 and including a GPS tracking unit disposed within the outer pouch between the outer layer and the RFID blocking layer.

* * * * *